Aug. 30, 1927.                                                                1,641,079
C. B. GAMBLE
GAS METER ATTACHMENT
Filed July 24, 1924                              2 Sheets-Sheet 1

INVENTOR
CHARLES B. GAMBLE
By Paul, Paul & Moore
ATTORNEYS

Aug. 30, 1927.  
C. B. GAMBLE  
GAS METER ATTACHMENT  
Filed July 24, 1924  
1,641,079  
2 Sheets-Sheet 2

INVENTOR  
CHARLES B. GAMBLE  
By Paul, Paul & Moore  
ATTORNEYS

Patented Aug. 30, 1927.

1,641,079

UNITED STATES PATENT OFFICE.

CHARLES B. GAMBLE, OF MINNEAPOLIS, MINNESOTA, ASSIGNOR OF ONE-HALF TO JOHN T. LUCAS, OF MINNEAPOLIS, MINNESOTA.

GAS-METER ATTACHMENT.

Application filed July 24, 1924. Serial No. 727,940.

This invention relates to improvements in gas meters such as are commonly used in buildings, homes, etc., to record or measure, in cubic feet, the amount of gas drawn from the service or main supply line for lighting, heating, or other purposes.

The particular object of this invention is to provide an attachment or a device to be used in conjunction with such a meter, whereby, should the registering mechanism therein fail to operate, the flow of gaseous fluid therethrough will subsequently be interrupted or shut off.

A further object of the invention is to provide in a gas meter, means for automatically closing and locking the intake port to the gas chamber therein when the meter is not functioning.

A further object is to provide such a device, which, when used in conjunction with a meter, will cause the flow of gas therethrough to be interrupted, should a leak occur in the measuring mechanism therein, such as in the diaphragms and valves.

Other objects of the invention will appear from the following description and the accompanying drawings and will be pointed out in the annexed claims.

In the drawings there has been disclosed a structure designed to carry out the various objects of the invention but it is to be understood that the invention is not confined to the exact features shown, as various changes may be made within the scope of the claims which follow.

In the accompanying drawings forming a part of this specification.

Figure 2:
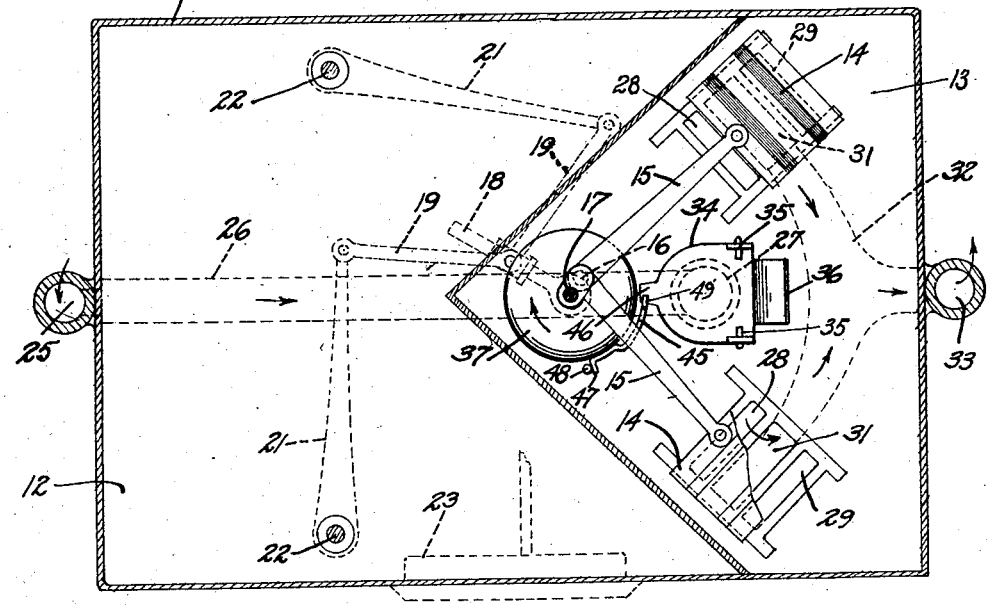
Figure 2 is a sectional plan on the line 2—2 of Figure 1.

In the selected embodiment of the invention here shown there is illustrated a gas meter of ordinary construction comprising a casing 11, in the lower part of which the usual diaphragms, (not shown) are mounted. The upper portion of the meter is separated from the diaphragm chambers by means of a gallery plate 12, thereby providing the usual compartment wherein the measuring mechanism is mounted. The usual gas chamber 13 is shown at one end of the gallery wherein the usual D slide valves 14 are reciprocally mounted and operated by means of connecting rods 15, which have one end connected to a crank 16 provided on the tangent post 17. An adjustable crank arm 18 is terminally mounted on the tangent post and has connected thereto a pair of connecting rods 19 which are operated by the flag arms 21 mounted upon the upper ends of upright shafts 22 which are connected to and actuated by the diaphragms when gas is flowing through the meter. The usual registering mechanism 23 is indicated in dotted lines in Figure 2 and is operable from the tangent shaft by means of the worm gears 24.

Figure 1:
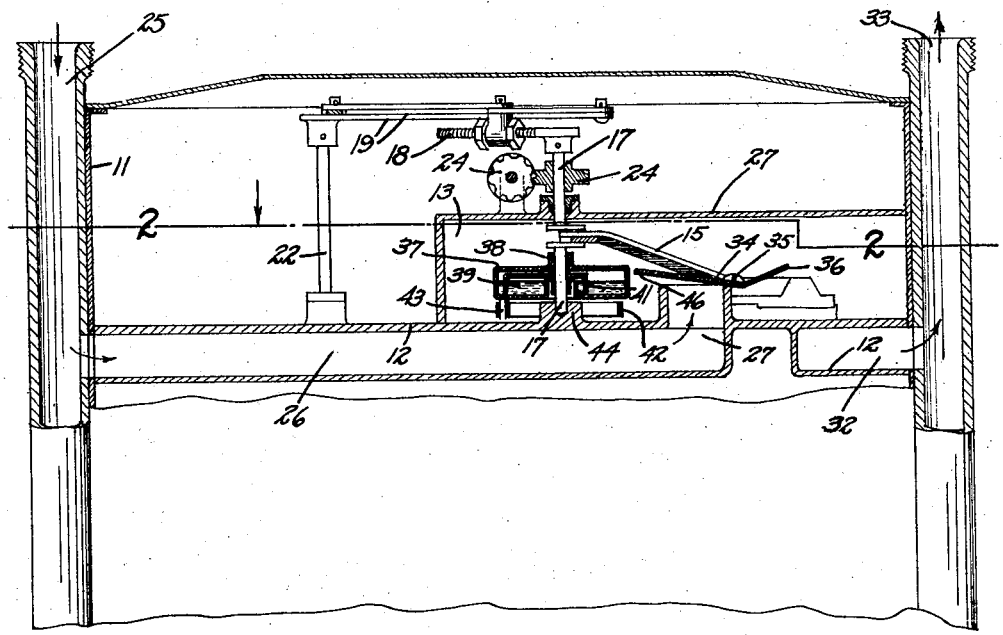
Figure 1 is a sectional elevation of the upper portion of a conventional form of gas meter showing my invention applied thereto.

The gas intake pipe 25 is shown at one side of the meter and this pipe communicates with the intake pipe 26 which has one end in communication with the gas chamber 13 through a port 27. Each slide valve 14 comprises three ports. The inner port 28 of each valve communicates with the interior of the diaphragms and the outer ports 29 communicate with the diaphragm chambers while the central port 31 in each valve communicates with a discharge passage 32 (shown in dotted lines in Figure 2) which communicates with the discharge pipe 33, shown also in Figure 1.

Figure 3:
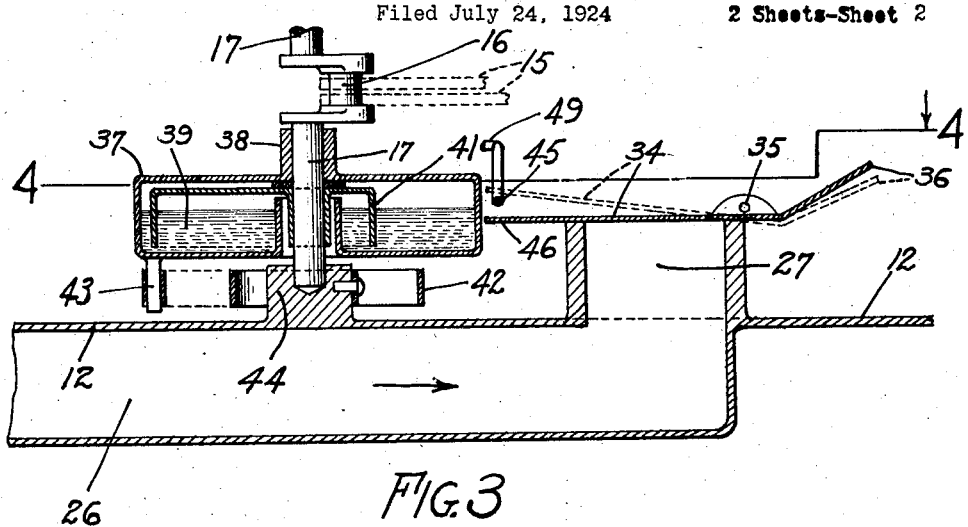
Figure 3 is an enlarged detail sectional view on the line 3—3 of Figure 4.
Figure 4:
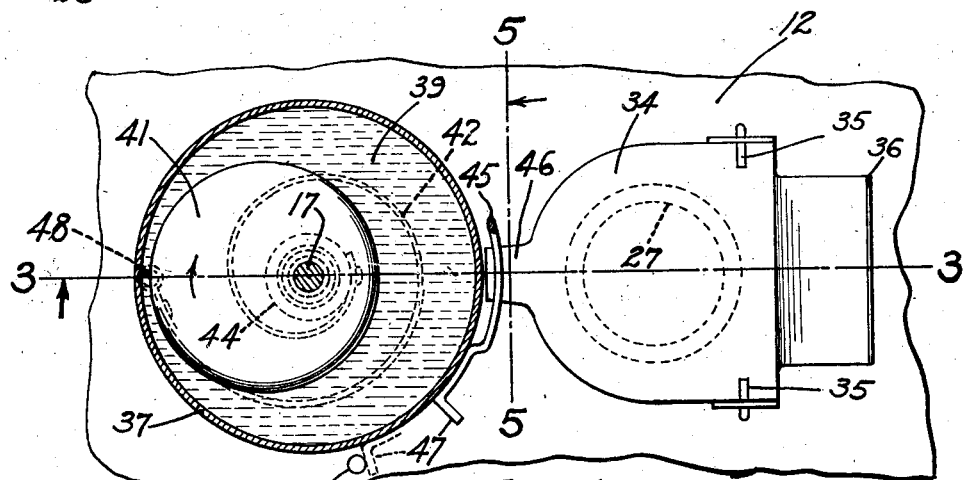
Figure 4 is a plan view of Figure 3 showing the valve in closed position.
Figure 5:
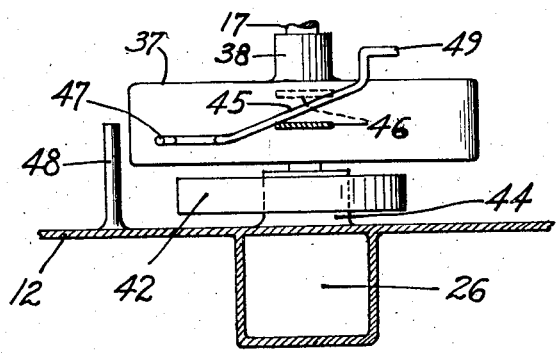
Figure 5 is a sectional view on the line 5—5 of Figure 4.

The important feature of this invention resides in the novel means provided for closing and locking the intake port 27 to the gas chamber 13 when the meter is inoperative. Such means preferably consists of a clapper valve 34 suitably mounted on pivots 35 secured to the gallery plate 12. An outwardly and upwardly extending end portion 36 is provided on the valve 34 and functions as a means to counterbalance the weight of the valve in order that it may be more readily opened by the pressure of the gas when the meter is functioning. The form of locking mechanism here shown for locking the valve in closed position preferably consists of a receptacle 37 having a top attached thereto in any convenient way as by soldering or brazing and a hub 38 provided thereon and bored loosely to fit the lower end of the tangent post 17, as shown in Figure 3. I have here shown this receptacle as formed of sheet metal but it is to be understood that it may be constructed of any suitable material and in any manner desired to serve the purpose. This receptacle is preferably filled with a viscous substance 39 such, for instance, as petroleum jelly, and an eccentric 41 is rigidly mounted upon the tangent post 17 adapted to rotate therewith and in the viscous medium 39. A spiral spring 42 is mounted beneath the receptacle 37 and has one end secured to a pin 43 provided on the receptacle and its other end secured to a boss 44 provided on the gallery plate 12 as particularly shown in Figure 3. This spring normally tends to prevent the receptacle 37 from rotating when the eccentric 41 and tangent post 17 are rotated, as will hereinafter be described. A cam 45 here shown as being formed of a small rod or wire is suitably secured to the outer wall of the receptacle 37 by such means as brazing or soldering. This cam is arranged in spaced relation to the periphery of the receptacle 37 and is adapted to engage a detent 46 provided on the clapper valve 34 as shown in Figures 3, 4 and 5. A stop 47 is provided on the receptacle 37 adapted to engage a stop pin 48 to limit the rotation of the receptacle 37 and therefore the cam 45. The cam wire 45 is also preferably provided with a horizontal end portion 49 adapted to overhang the detent 46 when the valve is in open position.

In the operation of this novel device in conjunction with a meter of the type here shown, the gas enters the intake pipe 25 from the service line, then passes through the intake passage 26, through the port 27 and into the gas chamber 13, the pressure of the gas causing the valve 34 to open. From the chamber 13, the gas passes through the ports 28 and 29, depending upon the position of the slide valves 14, and alternately into the interior of the diaphragms and into the diaphragm chambers in the lower portion of the casing 11 of the meter. The gas is then alternately pumped therefrom, by the oscillatory movement of the diaphragms, through either of the valve ports 28 or 29 through the D valves 14 and into the central port 31 to the discharge passage 32 and thence into the outlet pipe 33. As the diaphragms are thus actuated or expanded and depressed by the pressure of the gas and by the opening and closing of the valves 14, the shafts 22 will be caused to oscillate, thereby imparting a rotary movement to the tangent post 17 by means of the connecting rods 19 and crank arm 18. When gas is thus flowing through the intake port 27 and into the gas chamber and the meter is functioning, the cam 45 will be moved out of contact with the detent 46 on the valve 34 to the position shown in Figure 2, thereby allowing the valve to open. Such movement of the cam 45 is caused by the eccentric 41 rotating in the viscous medium contained in the receptacle which offers sufficient resistance to the eccentric rotating therein to cause it to rotate the receptacle against the tension of the spring 42 until the limit stop 47 engages the stop pin 48. As the tangent post 17 and the eccentric 41 continue to rotate, the receptacle 37 will be held in such position with the cam 45 out of engagement with the detent 46 of the valve until the flow of gas through the meter is interrupted or shut off, as when the burner or other device to which gas is being supplied is shut off. A soon as the gas through the meter is thus interrupted the tension of the spiral spring 42 will gradually rotate the receptacle 37 in the opposite direction, thereby moving the cam 45 into engagement with the detent 46 on the valve 34 with the resultant closing of the valve as shown in Figures 3, 4 and 5.

As soon as the burner cock or other device being supplied with gas is again opened, a decrease in gas pressure will be effected in the outlet of the meter, thereby causing the gas on the inlet side of the meter to expand with the result that a slight movement will be imparted to the tangent post. Because of the viscous medium within the receptacle 37 this receptacle will also be rotated caused by the eccentric 41 rotating therein. This rotation of the receptacle 37 causes the cam 45 to again be moved out of contact with the valve detent 46, thereby allowing the valve to be opened by the gas pressure beneath it.

Thus it will be seen that by the employment of this novel valve-locking means in conjunction with a gas meter the usual intake port therein will be automatically closed and locked, whenever the meter is not operating. Also should the registering mechanism fail to function on account of a leak in the diaphragms or valves allowing gas to pass without causing a movement of the meter mechanism, there will be no movement of the receptacle 37 and the cam wire 45 to unlock the valve 34 and allow the gas pressure to open it.

I claim as my invention:

1. A fluid meter having a fluid measuring meachnism including a fluid passage, a normally open valve therein and a rotary element actuated when the meter is operated, in combination with means tending to close said valve and hold it closed, means controlled by said element for resisting such tendency only while said element is rotating, whereby the valve will be closed when rotation ceases.

2. A fluid meter having a fluid intake and a normally open valve therefor, a rotary tangent post, means for locking the valve closed when the post is stationary, and means controlled by said post for releasing and holding said locking means in unlocking position while said post is rotating.

3. A fluid meter having a fluid intake port and a normally open valve therefor, a rotary tangent post, a receptacle rotatable about the tangent post and containing viscous fluid, an eccentric secured to said post and rotatable in said fluid, means for yieldingly resisting rotation of said receptacle with the eccentric means connected to the receptacle and actuated thereby and under the restoring influence of the resisting means when the post becomes stationary to close said valve and lock the same in its closed position, and release said valve when said post is rotating.

4. A fluid meter having a fluid intake port and a tilting valve therefor, a rotary tangent post, a cam device with means for moving it to a position for locking the valve closed and means actuated by the rotation of said tangent post for moving the cam device in the opposite direction for releasing said valve.

5. A fluid meter having a fluid intake port and a normally open valve therefor, a rotary tangent post, a receptacle rotatable about the tangent post and having a viscous fluid therein, an eccentric secured to said post and located in said fluid, a cam connected to said receptacle, and means coacting therewith to move said cam in position to close said valve when said tangent post is stationary said receptacle being actuable by the rotation of the post to move the cam to a position to release the valve.

In witness whereof, I have hereunto set my hand this 18th day of July, 1924.

CHARLES B. GAMBLE.